(12) United States Patent
Vial et al.

(10) Patent No.: US 11,468,339 B2
(45) Date of Patent: Oct. 11, 2022

(54) AGNOSTIC DATA STRUCTURE FOR DEBRIEFING PREDICTIVE SOFTWARE

(71) Applicant: SAP SE, Walldorf (DE)

(72) Inventors: Bertrand Vial, Boulogne Billancourt (FR); Jaques Doan Huu, Guyancourt (FR); Laya Ouologuem, Rueil Malmaison (FR); Nicolas Dulian, Houilles (FR)

(73) Assignee: SAP SE, Walldorf (DE)

( * ) Notice: Subject to any disclaimer, the term of this patent is extended or adjusted under 35 U.S.C. 154(b) by 1089 days.

(21) Appl. No.: 16/023,109

(22) Filed: Jun. 29, 2018

(65) Prior Publication Data

US 2020/0005160 A1 Jan. 2, 2020

(51) Int. Cl.
*G06F 16/242* (2019.01)
*G06N 5/02* (2006.01)

(52) U.S. Cl.
CPC .......... *G06N 5/02* (2013.01); *G06F 16/2428* (2019.01)

(58) Field of Classification Search
CPC ........ G06N 5/02; G06N 20/00; G06F 16/242; G06F 16/2428
See application file for complete search history.

(56) References Cited

U.S. PATENT DOCUMENTS

| | | | | |
|---|---|---|---|---|
| 8,185,486 B2 * | 5/2012 | Eder | ...................... | G06Q 40/08 706/45 |
| 9,542,646 B1 * | 1/2017 | Baughman | ............. | G06N 3/126 |
| 10,540,155 B1 * | 1/2020 | Spracklen | ................. | G06F 8/35 |
| 2010/0185645 A1 * | 7/2010 | Pazdziora | ............. | G06F 16/242 707/760 |
| 2010/0205124 A1 * | 8/2010 | Ben-Hur | ................ | G06N 20/10 706/12 |
| 2012/0323558 A1 * | 12/2012 | Nolan | ................... | G06F 40/211 704/9 |
| 2013/0246046 A1 * | 9/2013 | Fan | ........................ | G06F 40/30 704/9 |
| 2015/0293755 A1 * | 10/2015 | Robins | ............... | G06F 9/44526 717/174 |
| 2016/0098445 A1 * | 4/2016 | Riggs | .................. | G06F 16/2291 707/752 |
| 2016/0098645 A1 * | 4/2016 | Sharma | .................. | G06N 20/00 706/12 |

(Continued)

*Primary Examiner* — Phenuel S Salomon
(74) *Attorney, Agent, or Firm* — Buckley, Maschoff & Talwalkar LLC (57) ABSTRACT

Provided are systems and methods for generating an agnostic data structure that stores debriefing information for a predictive model. In one example, the method may include receiving training data of a predictive program having a model type from among a plurality of different model types, identifying values of generic debriefing information from the training data which is generic among the different model types and values of semantic debriefing information from the training data which is unique to the model type of the received predictive program from among the plurality of different model types, extracting the values of the generic debriefing information and the values of the semantic debriefing information, and storing the values of the generic debriefing information and the semantic debriefing information within an agnostic debriefing data structure.

18 Claims, 7 Drawing Sheets

(56) References Cited

U.S. PATENT DOCUMENTS

| | | | |
|---|---|---|---|
| 2016/0148096 A1* | 5/2016 | Bornea | G16H 70/60 |
| | | | 706/55 |
| 2016/0321277 A1* | 11/2016 | Costabello | G06F 16/122 |
| 2016/0350671 A1* | 12/2016 | Morris, II | G06N 20/00 |
| 2017/0132280 A1* | 5/2017 | Li | G06F 16/24534 |
| 2017/0262275 A1* | 9/2017 | Mohiuddin | G06F 8/65 |
| 2018/0060744 A1* | 3/2018 | Achin | G06N 5/02 |
| 2018/0075354 A1* | 3/2018 | Averboch | G06F 17/18 |
| 2019/0180358 A1* | 6/2019 | Nandan | G06K 9/6269 |

* cited by examiner

Performance Indicators

Predictive Power (82%)

Prediction Confidence (94%)

Variable Contributions

| | | |
|---|---|---|
| Marital Status |  | 23% |
| Capital Gain |  | 20% |
| Occupation |  | 18% |
| Education |  | 7% |

Target Statistics

| Data Partition | Target Category | | |
|---|---|---|---|
| Training | 0 |  | 75% |
| Training | 1 |  | 24% |
| Training | 2 |  | 18% |
| Training | 3 |  | 7% |

FIG. 3

Generic Metric Information 310

Owner ID: varchar(256) <pk>
Model ID: varchar(256) <pk>
Data Set ID: varchar(16) <pk>

Owner Type: varchar(32)

Name: varchar(16) <pk>
Value: float
Label: varchar(16)

Generic Property Information 320

Owner ID: varchar(256) <pk>
Model ID: varchar(256) <pk>
Owner Type: varchar(32)

Name: varchar(64) <pk>
Value: varchar(512)
Data Type: varchar(256)
Label: varchar(16)

Receiving Learning Information of a Predictive Software Model having a Model Type from Among a Plurality of Model Types — 510

Identifying Generic Debriefing Information and Semantic Debriefing Information from the Learning Information of the Predictive Software Model — 520

Extracting Values of the Generic Debriefing Information and the Semantic Debriefing Information — 530

Storing the Extracted Values in an Agnostic Debriefing Data Structure — 540

FIG. 6

AGNOSTIC DATA STRUCTURE FOR DEBRIEFING PREDICTIVE SOFTWARE

BACKGROUND

Predictive analytics can guide organizations in making informed decisions by predicting future scenarios. According to predictive analytics, predictive models are "learned" based on large volumes of historical data and the models are then deployed to predict the future scenarios. In a software environment, predictive models (also referred to as predictive software programs) can be made available for use by multiple different business entities. Predictive models generally undergo a multi-stage process including several iterations of training and testing before the model can be deployed into a live (production) environment. Each iteration further refines the model.

A debrief may be generated to assist in the training and testing of a predictive model. The debrief may include information about the model such as an overview, target statistics, components, performance indicators, and the like, which can provide insight into operation of the model and the relative influence of various factors on the output of the model. Currently, a debrief is generated based on a running instance of analytic software in which the model is deployed. In other words, generation of the debrief requires the loading of a running instance of the analytic software into the testing environment. However, the loaded analytic software can occupy significant system resources and require additional time during each iteration for generating a debrief. Accordingly, what is needed is a more efficient system to generate and utilize a debrief of a predictive model.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

A predictive model may be trained (machine learning) through a neural network or other suitable mechanism using historical data. The resulting model may include a polynomial with one or more variables having weights, coefficients, and the like. After a suitable level of training, the trained model may be deployed into an application in a production environment where it can provide a prediction based on live application data. Predictive models can be applied to various technologies such as supply chain, weather, machine/equipment assets, maintenance, and the like. The predictive model may be trained based on patterns, trends, anomalies, and the like, identified within historical data. As one example, a predictive model may include a sum of different variables each with a coefficient and a weight. Various types of predictive models exist including, for example, regression, classification, clustering, time-series, and the like.

Models are typically trained in a testing environment where errors and other problems do not affect actual production data. When an iteration of training is completed, a debrief of the performance of the predictive model can be generated. The debrief may provide information indicating whether the model is correct (i.e., performing well enough to be deployed). The debrief may include target statistics, model components, model performance, influencers/indicators and the like. This information can enable a developer/tester of the predictive model to determine whether the training is finished and the model is ready to be deployed. In other words, the debrief can indicate how well the model is performing based on inputs applied to the model, key influencers, predefined targets, variables, performance criteria, and the like. For example, the target statistic may include a name of a target variable for which the statistics are stored, min value found in the dataset, max value, mean, standard deviation, etc. As another example, model performance information may include performance indicators which influence the performance of the model, etc., whether the model is accurate, target value sufficient, error information, and the like.

The debrief may be based on an analytic software application in which the predictive model is to be deployed. In other words, the debrief may evaluate model performance with respect to a particular analytic software application. Typically, an instance of the analytic software application (i.e., in which the model is to be deployed) must be running in order to generate the debrief. This running instance of the analytic software allows the data associated with the specific use case to be extracted from the predictive model and analyzed. For example, proprietary API calls can be made to the analytic software application and data for the debrief can be extracted therefrom. However, this running instance of the analytic software application consumes significant resources, takes time to manage start/stop, and can be difficult to interact with without significant integration.

According to various embodiments, a generic debrief can be generated without the need for a running instance of a software analytic application. The generic debrief may export debriefing information in a generic schema regardless of model type which can be efficiently queried (e.g., by a client, developer, etc.) to generate the debrief of the predictive model with respect to the software analytic application. The generic debrief packages all information into a generic data structure (referred to herein as an agnostic data structure) which increases an efficiency of queries needed to produce the debrief. The agnostic data structure may have a multi-layered format including a first layer referred to as a storage layer (generic) and a second layer referred to as a semantic layer (dynamic). The generic storage layer may include a description of the content of the debrief (storage definition, table definition, storage type, etc.) The semantic information may include information about model performance such as key indicators, target variables, and the like. The storage layer may be implemented via one or more tables and the semantic layer may be implemented in a view which includes an entity relational representation of the semantic data of the model.

The example embodiments provide a technical solution to the traditional debriefing process by generating an agnostic data structure that can be queried efficiently to produce a debrief for any type of analytic software application. The agnostic data structure can store data of a predictive model in a generic package. The agnostic data structure can be interrogated using a set of queries regardless of the type of predictive model. Generic data of the model, which may include table data, table properties, table definitions, storage types, and the like, may be stored in a first component of the agnostic data structure. Meanwhile, semantic data of the model (also referred to herein as dynamic data) may include a description of the table data stored in the generic data component as well as a description for how to extract the data. The description may be implemented in an entity relational diagram or view which shows relationships between data of the predictive model.

During a debriefing process, queries may determine a type of model, and a relationship of the data stored in the storage component from the semantic component, and extract any table data needed for a particular use case from the generic data component based on such relationship information. The agnostic data structure can simplify the process of generating a debriefing of a predictive model by creating a generic data package that can be used for debriefing regardless of the type of predictive model and the use case for the predictive model. The debriefing process can then extract whatever data is needed by the application/user from the agnostic data structure for a particular use case. Therefore, the debriefing process may extract different data dependent on the use case, however, the generic structure of the data is still the same.

Figure 1:
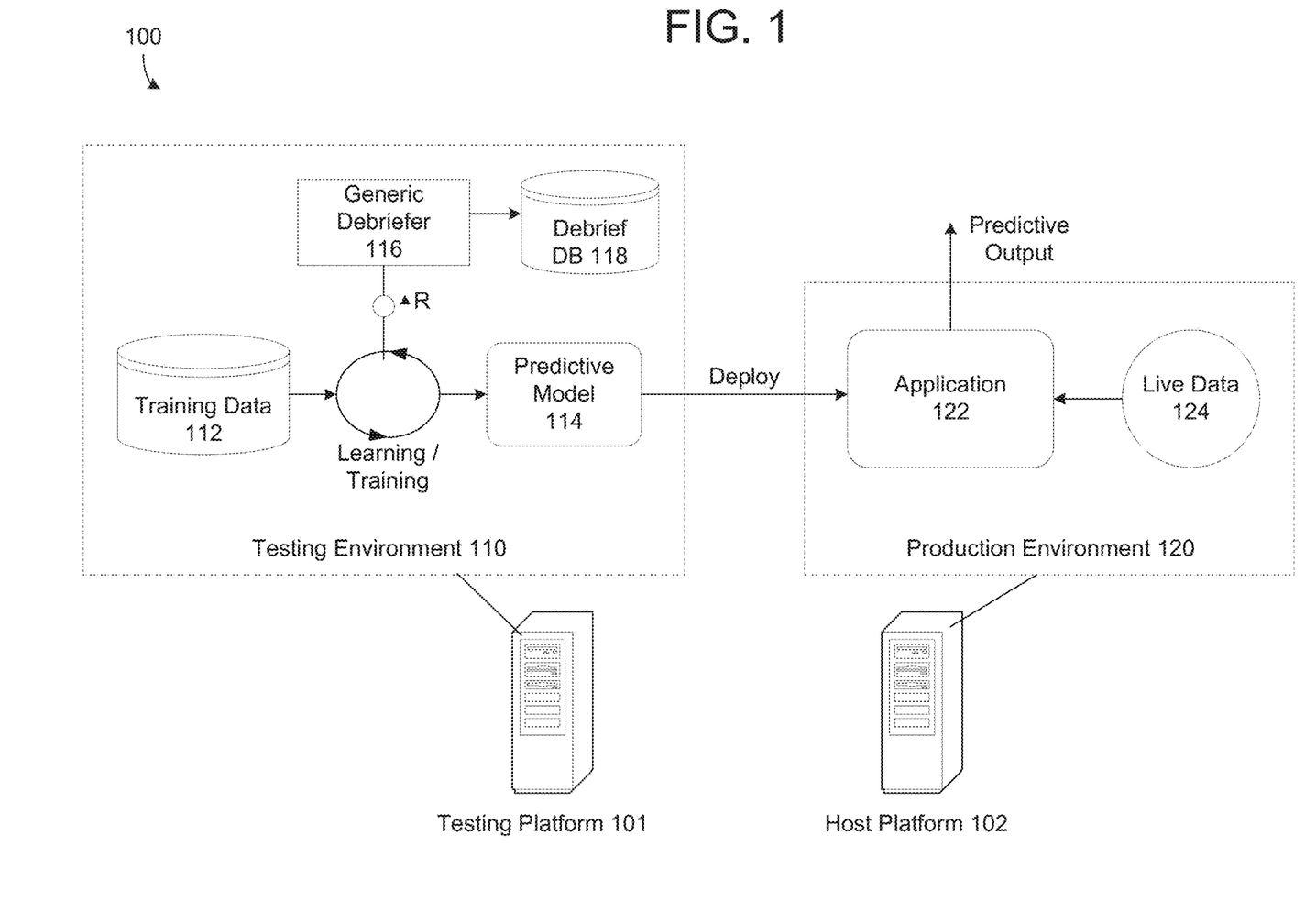
FIG. 1 is a diagram illustrating a computing environment for generating a debrief in accordance with an example embodiment.

FIG. 1 illustrates a computing environment 100 for deploying a predictive model in accordance with an example embodiment. Referring to FIG. 1, the environment 100 may include multiple executing environments such as a testing environment 110 (also referred to as a development environment) and a production environment 120 (also referred to as a live environment). In this example, the testing environment 110 is operated by a testing platform 101 and the production environment 120 is operated by a host platform 102. For example, each of the testing platform 101 and/or the host platform 102 may be a server, a cloud platform, a database, a combination of devices, and the like. Although not shown in FIG. 1, in some cases, the testing environment 110 and the production environment 120 may be operated by the same computing system or they may be operated by different devices or groups of devices.

The testing environment 110 may include an operating environment where a software model 114 is being used theoretically. Within the testing environment 110, users such as model developers may build the predictive model 114 and train the model 114 based on historical data 112. The users may look for bugs, design defects, and the like, while evaluating a performance of the predictive model through an iterative process. Meanwhile, the production environment 120 is where the software model 114 is deployed and put into operation for its intended use. The production environment 120 may include a real-time setting where the predictive model 114 is run and hardware setups are installed and relied on for integration with an application 122. For example, when a request is received, the predictive model 114 may be deployed from the testing environment 110 into the production environment 120 and integrated with application 122. The application 122 may be controlled by a business entity or the like that is not related to the predictive model 114. Therefore, the predictive model 114 and the application 122 may not be compatible with one another.

In industrial use cases, the testing environment 110 where changes are originally made and the production environment 120 (end users) are separated through several stages in between. This structured release management process allows for phased deployment (rollout), testing, and rollback in case of problems. The stages may include an initial hypothesis stage where a hypothesis is proposed, a load and transform data stage where data relevant to the hypothesis is collected and converted to fit a framework, a feature identification stage where data scientists can tailor a model to accurately represent key patterns in the data, a model building stage where one or more machine learning algorithms may be selected based on various factors (data, use case, available computational resources, etc.) and used to create predictive model 114, an evaluation stage where the predictive model 114 is tested and trained against data to accurately predict outcomes, and a deployment stage where the fully trained predictive model 114 is launched or otherwise deployed into the live production environment 120 where it can generate and output predictions based on live data 124.

According to various embodiments, the testing environment 110 may also include a generic debriefer 116 that may obtain data of the model as it is trained and tested, and package the data generically in a format that can be used to easily generate a debrief. For example, the generic debriefer 116 may generate an agnostic data structure for a predictive model and store the agnostic data structure within a database 118, or other repository. The generic debriefing information stored within the database 118 may be interrogated to determine whether the predictive model 114 is satisfactory for a use case such as application 122 which may be a predictive analytic software application. If the predictive model 114 is determined to be correct based on the debrief, the predictive model 114 may be integrated within the application 122.

The representation of a predictive model varies because of its nature of use, according to a type of user profile (e.g., expert vs. business profile, etc.), and the like. Therefore, the information level or the content for a debriefing is not the same and debriefings must be customized for different types of models, different types of user profiles, and the like. Moreover, a predictive model requires representations specific to the nature of the model. For example, a classification model does not have the same representation as a clustering model. In addition, for a predictive model, the debriefing phase may require an instance of an analytic software application to retrieve information by proprietary application programming interface (API) calls. Therefore, due to the adaptability of a model debriefing, it is difficult to precompute or otherwise prepackage a reporting model so each debriefing needs a reload of a model and retrieves information with different API calls. The result is poor performance of the system due to model reloading by debrief.

The example embodiments provide for an agnostic data structure that can be used to store data from the predictive model in a generic format that can be queried through simple set of structured query language (SQL) queries to generate a debrief. The agnostic data structure persists data from the predictive model in two layers, include a generic storage layer which includes table data, definitions, storage types, and the like, which is information that is shared by all types of predictive models. In addition, the agnostic data structure may include a specialized layer (referred to as a semantic layer) which includes an entity relational representation defining all required information to build an effective debriefing. The entity relational representation may be intended to be stored in a relational database and can be interrogated with a standard query language. For example, the entity relational representation may identify the specifics of each predictive model such as an iteration process for a classification model or a square process for a clustering model. The evolution of debriefings may be managed at runtime and only the semantic layer may be impacted while the generic storage layer remains the same. Accordingly, the agnostic data structure allows for building a collection of queries allowing the debriefing of a predictive model while taking into account the user profile (adaptability).

The agnostic data structure makes it possible to dispense with having an instance for each debriefing, which increases system efficiency. Another advantage is based on using the standard query language, because it allows to customize or adapt debriefings from the same information, with how to present the data being adaptable. Another advantage is the user of the multiple layers, because the predictive model information can be isolated into an untyped storage layer (not dependent on the nature of the predictive model), which is invariant from a semantic layer which is exploited at runtime. Accordingly, in case of evolution, only the semantic layer is impacted (flexibility).

Figure 2A:
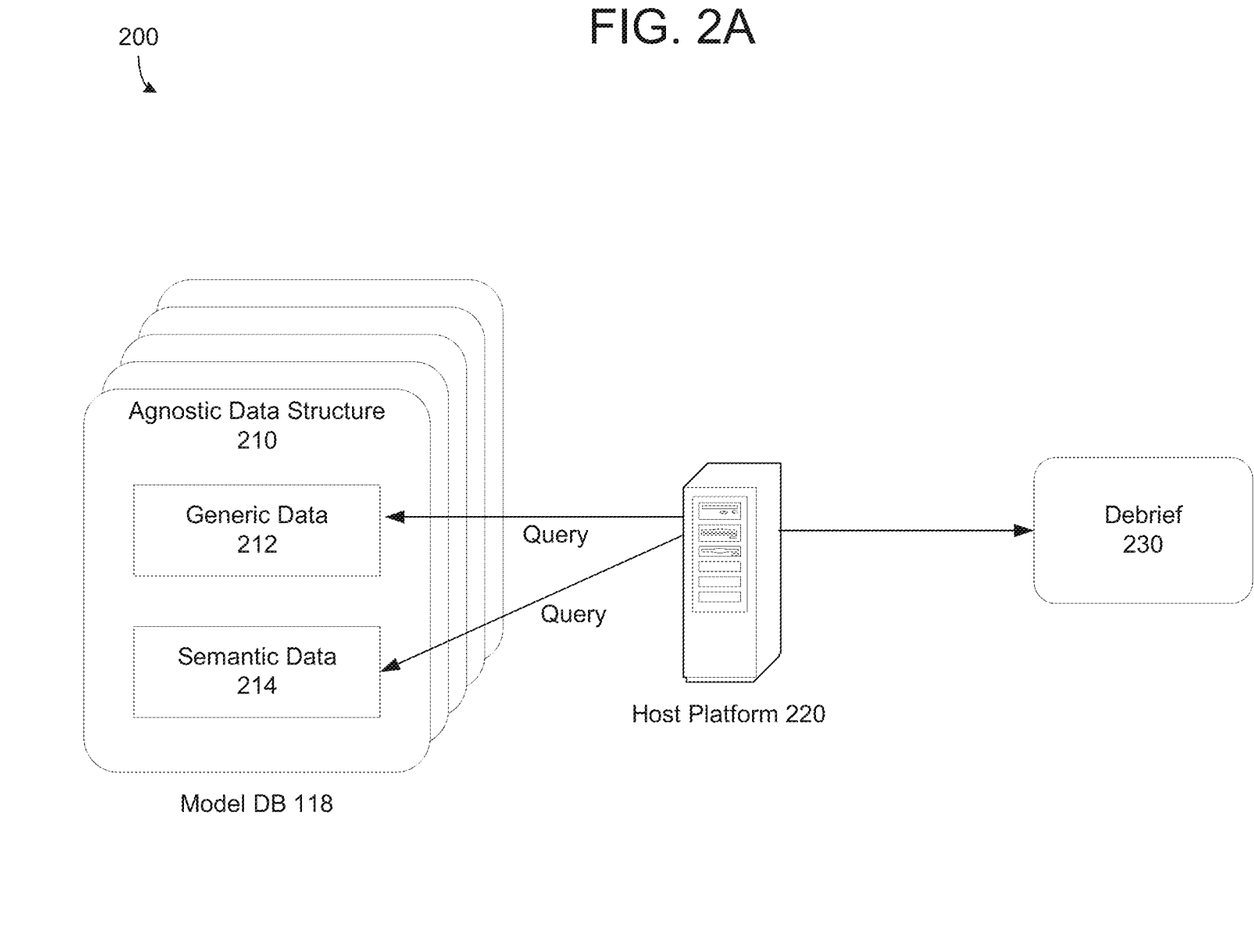
FIG. 2A is a diagram illustrating a process of querying an agnostic data structure for building a debrief of a predictive model in accordance with example embodiments.

FIG. 2A illustrates a process 200 of querying an agnostic data structure 210 for building a debriefing of a predictive model in accordance with example embodiments. For example, the predictive model may be the predictive model 114 shown in FIG. 1, and may include one or more of a regression model, a classification model, a clustering model, a time-series model, and the like. Referring to FIG. 2A, the agnostic data structure 210 includes a generic data component 212 and a semantic data component 214. For example, the generic data component 212 may include table data which may include underlying data values, storage types, metrics, numerical data, and the like, of the predictive model. The generic data may be stored in one or more tables. The semantic data component 214 may include relational information identifying relationships between components of formula(s) within the predictive model. The relational information may be stored in an entity relational diagram which describes how the data stored in the generic data 212 interacts with one another. The semantic data 214 may be stored in a view. The entity relational representation may be based on a tree structure that is generated from formula(s) within a predictive model.

Figure 2B:
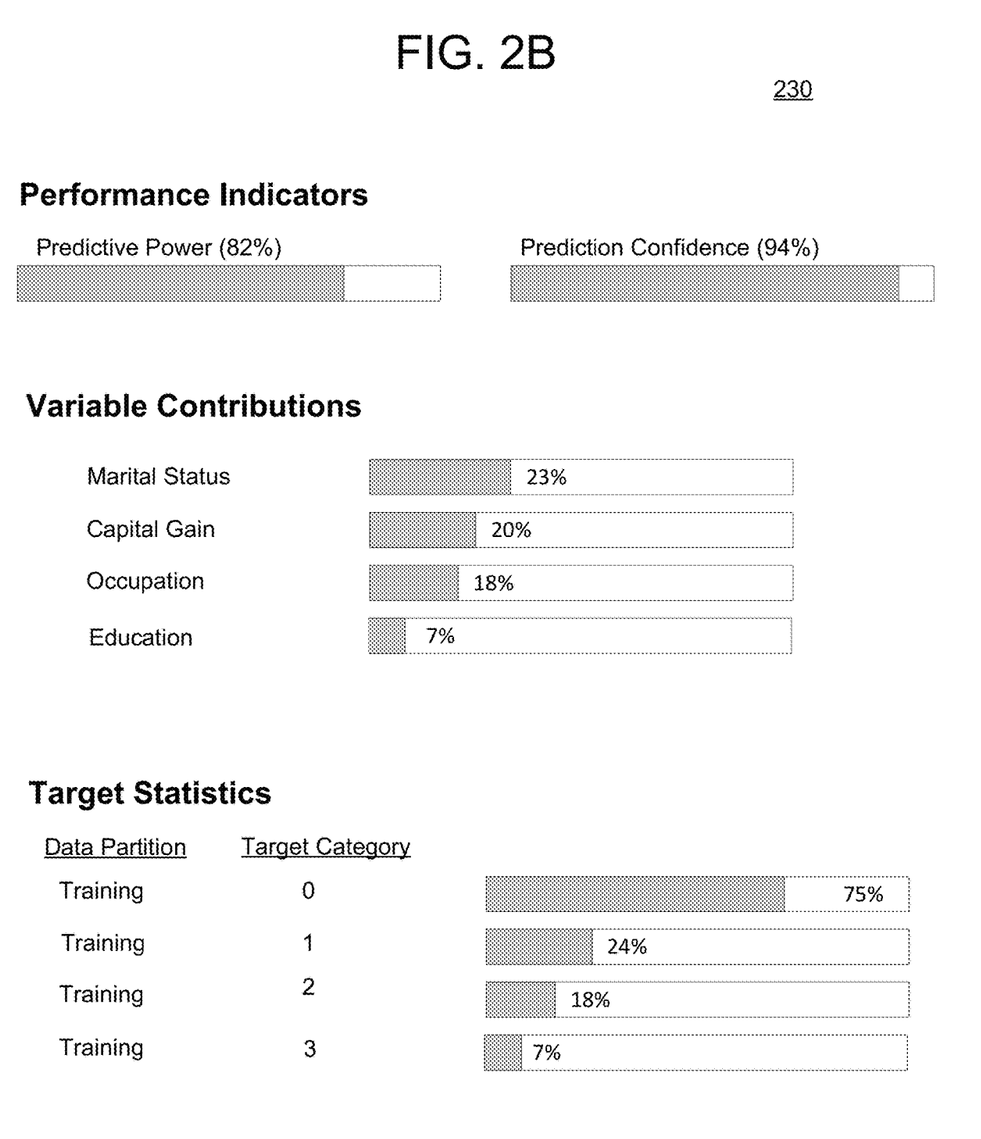
FIG. 2B is a diagram illustrating a user interface displaying a debrief of the predictive model in accordance with example embodiments.

In the process 200, a host platform 220 may query the agnostic data structure 210 to generate a debrief 230 of a predictive model. For example, the querying may include one or more SQL queries, NOSQL queries, or the like. As an example, the host platform 220 may first query the semantic data 214 to identify how the data is to be extracted from the generic data 212 (i.e., how the data interacts). The host platform 220 may then query the generic data 212 based on the information obtained from the semantic data query, and generate the debrief 230. The debrief 230 may include information about the performance of the predictive model with respect to an analytic software application where the model is to be deployed. Furthermore, the debrief may be generated based on data from one agnostic data structure 210, or multiple agnostic data structures stored in a database/repository such as database 118 in FIG. 1. An example of the debrief 230 is shown on the user interface displayed in FIG. 2B. Here, the debrief 230 includes key performance indicators, variable contributions, target data statistics, and the like. It should also be understood that many other types of information may be included in the debrief 230 such as model information, and the like.

Figure 3:
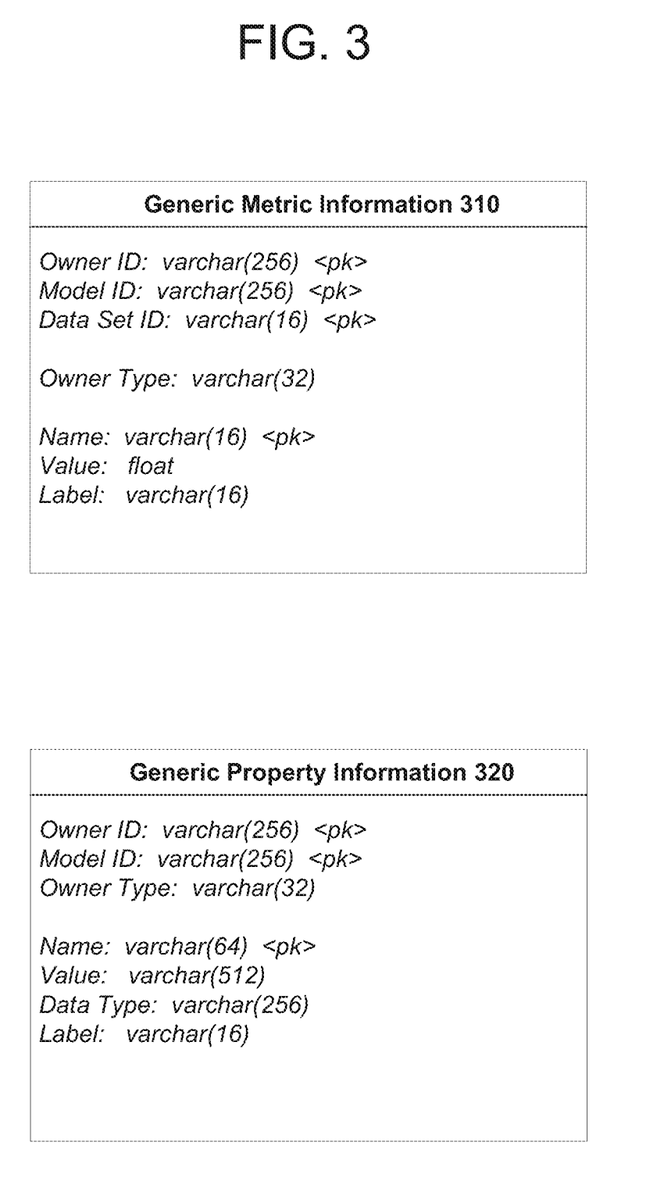
FIG. 3 is a diagram illustrating an example of generic data that may be included in an agnostic data structure in accordance with an example embodiment.
Figure 4:
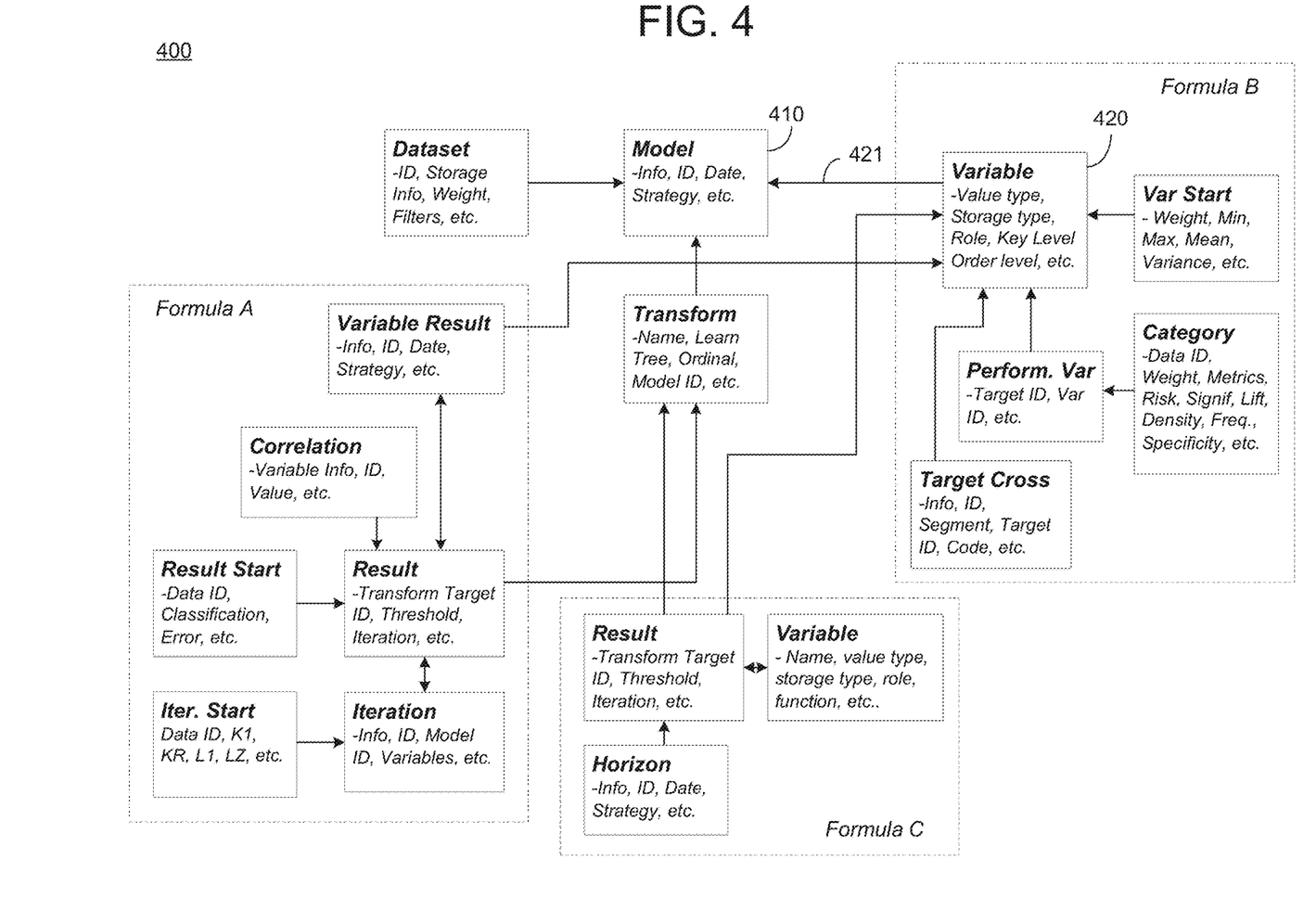
FIG. 4 is a diagram illustrating an example of semantic data that may be included in an agnostic data structure in accordance with an example embodiment.

FIG. 3 illustrates an example of generic data that may be included in the agnostic data structure 210 of FIG. 2A in accordance with an example embodiment, and FIG. 4 illustrates an example of semantic data that may be included in an agnostic data structure 210 of FIG. 2A in accordance with an example embodiment. Referring to FIG. 3, the generic data may include one or more of generic metric information 310 and generic property information 320. The generic data may be stored in table format having values in row-column format. Information included in the generic data may include numerals, strings, floats, and the like. The generic data may also identify an owner of the data, a model ID, a data set ID, a name, value, and label of the table, and the like. The metric information may include mean value, error data, standard deviation, min and max data ranges, and the like, associated with the predictive model.

Referring to FIG. 4, the semantic data may include an entity relational representation 400 which indicates how entities of the predictive model interact with one another. In this example entities 410 are illustrated with boxes, and relationships are indicated with lines and arrows, however, embodiments are not limited thereto. In some cases, the entity relational representation may be a description, or the like. The entity relational representation 400 may identify how to build the predictive model in a different format such as a format of the programming language of the application where the model is being deployed. For example, the semantic data such as the entity relational relationship may be stored as a view. The view may include virtual tables. Unlike ordinary base tables in a relational database, a view does not form part of the physical schema. Rather, for example, the view may be a result set which includes a virtual table computed or collated dynamically from data in the database when access to that view is requested. Changes applied to the data in a relevant underlying table may be reflected in the data shown in subsequent invocations of the view.

Figure 5:
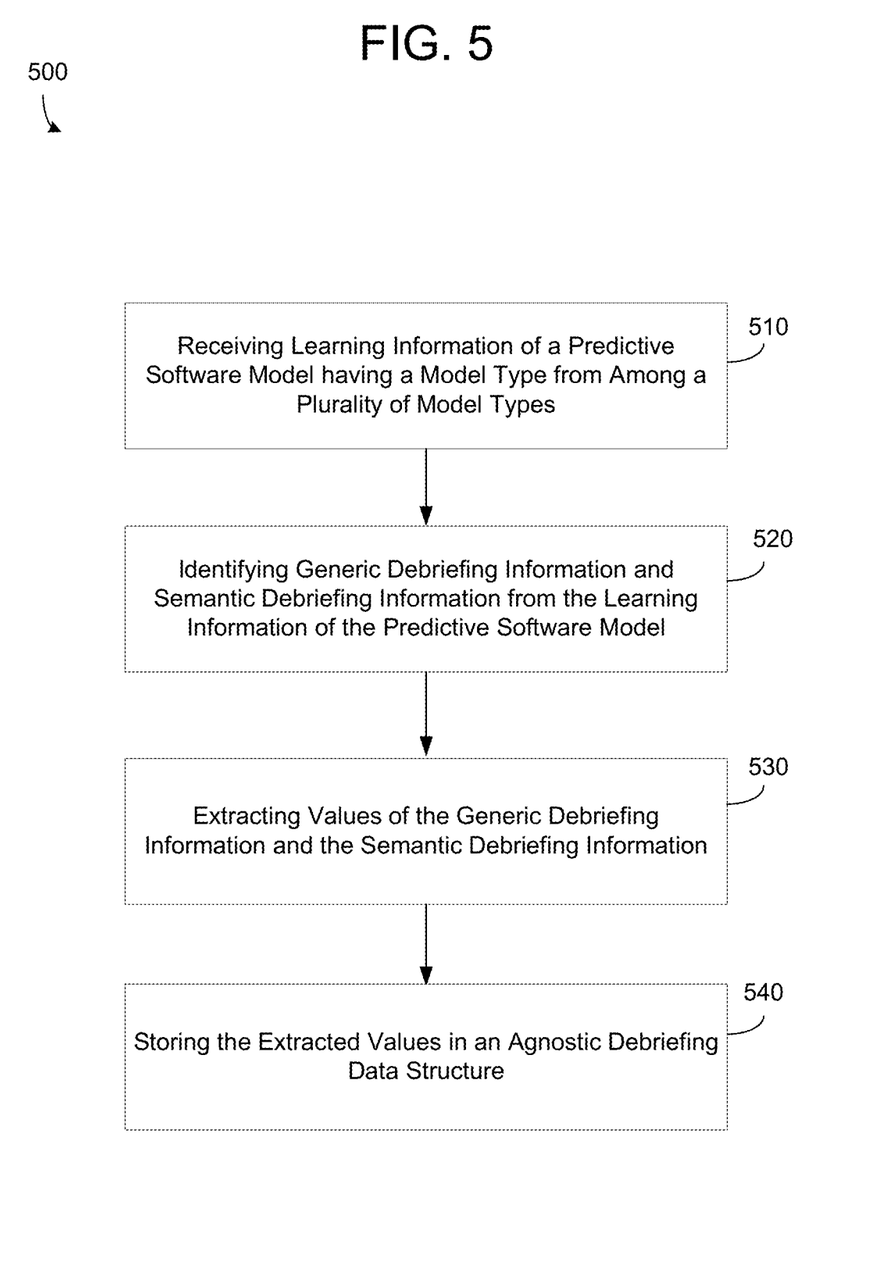
FIG. 5 is a diagram illustrating a method for generating an agnostic data structure for a predictive model debriefing in accordance with an example embodiment.

FIG. 5 illustrates a method 500 or generating an agnostic data structure for a predictive model debriefing in accordance with an example embodiment. As an example, the method 500 may be performed by a database node included within a distributed database system. As another example, the method 500 may be performed by a server, a cloud platform, a user device, and the like. In some examples, the method 500 may be performed by a plurality of computer devices in combination (e.g., a database node and a server, etc.) Referring to FIG. 5, in 510, the method may include receiving training data of a predictive program that has a model type from among a plurality of different model types of predictive programs. For example, the training data may include information about a neural network where the training is performed, performance information of the model on the neural network, machine learning formula data, model identification information, and the like. In some examples, the type of machine learning model may include one or more of a classification model, a regression model, a clustering model, a time-series model, and the like.

In 520, the method may include identifying values of generic debriefing information from the training data of the predictive program that is generic among the different model types and identifying values of semantic (dynamic) debriefing information from the training data of the predictive program that is unique to the model type of the received predictive program from among the plurality of different model types. The generic debriefing information may include data that is used by the model and that is common (or common in type) to all or most models among the different possible types of models. For example, the generic data may include table data of values (numbers, integers, strings, etc.). Here, the generic debriefing information may include values of statistical information, numerical information, metric information, mean, standard deviation, error range, data range, data set identifiers, and the like, which are consumed by the model. In some embodiments, the generic debriefing information may include a value for storage type and an identification of data values processed by the predictive program.

Meanwhile, the semantic debriefing information may include a description of some performance indicators that influence the model, information about target statistics, neural network information, variable information, and the like. In some embodiments, the semantic debriefing information may include an entity relational representation that identifies data entities among the predictive model and provides interconnection information between the data entities. The entity relational representation may be used to represent relationships between the semantic value type.

In 530, the method may include extracting the values of the generic debriefing information and the values of the semantic debriefing information, and in 540, the method may include storing the values of the generic debriefing information and the semantic debriefing information within an agnostic debriefing data structure. According to various embodiments, the agnostic debriefing data structure comprises a query structure format that is agnostic for the plurality of different predictive model types. For example, the query structure may be queried through a set of SQL queries to obtain information for generating a debriefing. For example, the generic debriefing information and the semantic debriefing information may be inserted in one or more tables of the agnostic debriefing data structure. In some embodiments, the method may further include debriefing the predictive program based on the generic debriefing information and the semantic debriefing information stored in the agnostic debriefing data structure and generating a code insert for an application based on the debriefing.

Figure 6:
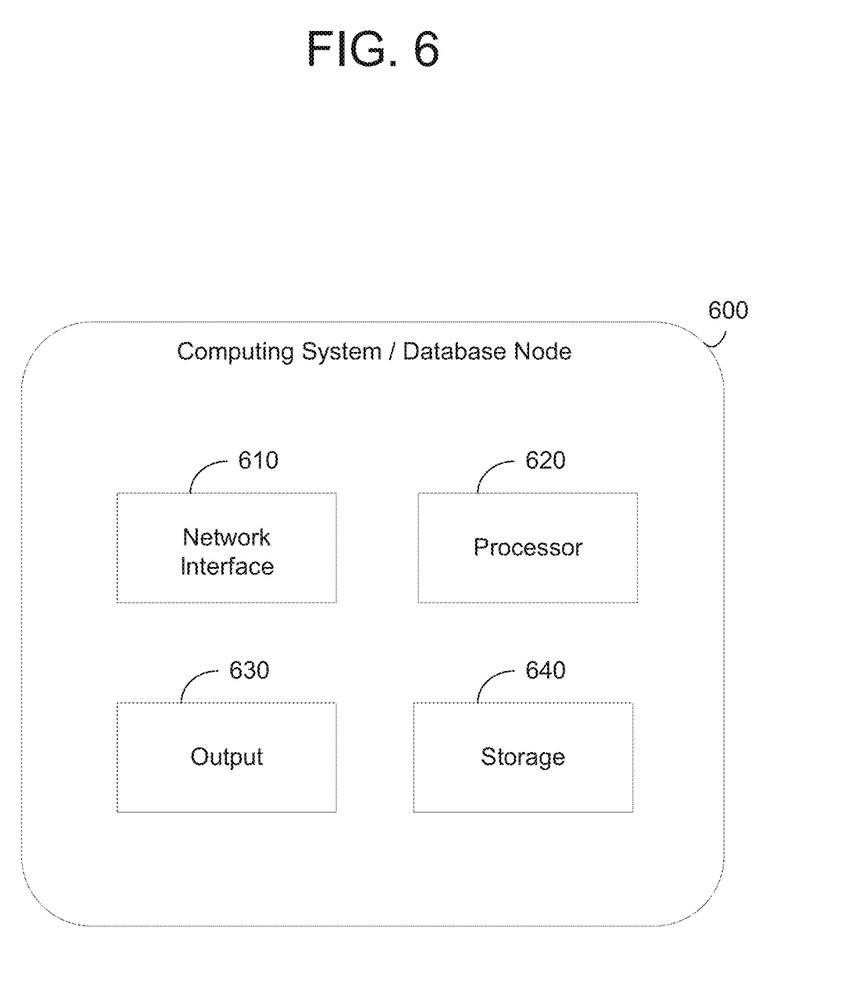
FIG. 6 is a diagram illustrating a computing system in accordance with an example embodiment.

FIG. 6 illustrates a computing system 600 in accordance with an example embodiment. For example, the computing system 600 may be a database node, a server, a cloud platform, a user device, or the like. In some embodiments, the computing system 600 may be distributed across multiple devices. Referring to FIG. 6, the computing system 600 includes a network interface 610, a processor 620, an output 630, and a storage device 640 such as an in-memory storage (e.g., RAM, etc.) Although not shown in FIG. 6, the computing system 600 may also include or be electronically connected to other components such as a display, an input unit, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 600, an externally connected display, a display connected to the cloud, another device, and the like. For example, the output 630 may include a port, an interface, a cable, a wire, a board, and/or the like, with input/output capabilities. The network interface 610, the output 630, or a combination thereof, may interact with applications executing on other devices. The storage device 640 is not limited to a particular storage device and may include any known memory device such as RAM, NRAM, ROM, hard disk, and the like, and may or may not be included within the cloud environment. The storage 640 may store software modules or other instructions which can be executed by the processor 620 to perform the method 500 shown in FIG. 5.

According to various embodiments, the processor 620 may receive training data of a predictive program that has a model type from among a plurality of different model types of predictive programs. For example, the predictive program may be based on a model from among one or more of a regression model, a classification model, a clustering model, a time-series model. The training data may include variable information, target statistics, model overview, performance information, and the like, of the predictive model during training. Different model types may include different types of formulas, variables, data ranges, correlations, weights, and the like.

The processor 620 may identify values of generic debriefing information from the training data of the predictive program that is generic among the different model types and values of semantic debriefing information from the training data of the predictive program that is unique to the model type of the received predictive program from among the plurality of different model types. For example, the processor 620 may identify statistical, numerical, metrics, error ranges, data set ranges, storage types, and the like, included within the program which are values that are commonly found in all types of predictive model types.

Meanwhile, the semantic debriefing information may include different value types for operations of the predictive program based on the model type from among the plurality of model types. For example, the semantic debriefing information may include entity relational information that identifies performance through transformation information, formula information, correlation information, weighting information, variable information, clustering information, and the like, each of which may or may not be included within a predictive model based on a model type. In some embodiments, the semantic debriefing information may be represented with an entity relational representation.

The processor 620 may extract the values of the generic debriefing information and the values of the semantic debriefing information, and store the extracted values within one or more tables or other data structures of the storage 640. According to various embodiments, the processor 620 may store the values of the generic debriefing information and the semantic debriefing information together within an agnostic debriefing data structure. Here, the agnostic debriefing data structure may include a query structure format that is agnostic for the plurality of different predictive model types. Accordingly, a set of queries such as SQL queries may be used to interrogate the agnostic debriefing data structure to identify information needed for generating a full debriefing of the predictive model. In some embodiments, the queries may first identify the semantic information from the a semantic storage component of the agnostic debriefing data structure and based on the semantic information, extract the generic information from a generic component of the agnostic debriefing data structure. As an example, the generic debriefing information and the semantic debriefing information may be stored in one or more respective tables of the agnostic debriefing data structure. In some embodiments, the processor 620 may debrief the predictive program based on the generic debriefing information and the semantic debriefing information stored in the agnostic debriefing data structure and generate a model debrief of the predictive model. However, rather than performing a debriefing at each iteration of the training, the system can perform the debriefing based on agnostic data structures stored in a debrief database without having to load the predictive model.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
    receive training data of a predictive program having a model type from among a plurality of different model types,
    identify values of generic debriefing information from the training data that is generic among training of the different model types and values of semantic debriefing information from the training data which includes information identifying how to build a debrief report from the values of generic debriefing information, and
    generate a debriefing data structure that includes the generic debriefing information and a view for the semantic debriefing information; and
a storage configured to store the debriefing data structure, wherein the processor is further configured to query the debriefing data structure via one or more of structured query language (SQL) and NoSQL queries for the semantic debriefing information and the generic debriefing information, and generate the debrief report based thereon.

2. The computing system of claim 1, wherein the generic debriefing information comprises a value for storage type and table data to be processed by the predictive program.

3. The computing system of claim 1, wherein the semantic debriefing information further comprises information indicating how to extract data from the generic debriefing information of the predictive program based on a model type of the predictive program.

4. The computing system of claim 1, wherein the semantic debriefing information comprises an entity relational representation diagram that identifies relationships between variables within polynomials of the predictive program.

5. The computing system of claim 1, wherein the debriefing data structure comprises a query structure format that is agnostic for the plurality of different predictive model types.

6. The computing system of claim 1, wherein the generic debriefing information is stored in one or more tables of the debriefing data structure.

7. The computing system of claim 1, wherein the model type is selected from a group including two or more of a classification type, a regression type, a clustering type, and a time-series type.

8. A method comprising:
receiving training data of a predictive program having a model type from among a plurality of different model types;
identifying values of generic debriefing information from the training data which is generic among the different model types and values of semantic debriefing information from the training data which includes information identifying how to build a debrief report from the values of generic debriefing information;
generating a debriefing data structure that includes the values of the generic debriefing information and a view for the semantic debriefing information; and
storing the debriefing data structure; and
querying the debriefing data structure via one or more of structured query language (SQL) and NoSQL queries for the semantic debriefing information and the generic debriefing information, and generating the debrief report based thereon.

9. The method of claim 8, wherein the generic debriefing information comprises a value for storage type and table data to be processed by the predictive program.

10. The method of claim 8, wherein the semantic debriefing information further comprises information indicating how to extract data from the generic debriefing information of the predictive program based on a model type of the predictive program.

11. The method of claim 8, wherein the semantic debriefing information comprises an entity relational representation diagram that identifies inter-relationships between variables of polynomials within the predictive program.

12. The method of claim 8, wherein the debriefing data structure comprises a query structure format that is agnostic for the plurality of different predictive model types.

13. The method of claim 8, wherein the generic debriefing information is stored in one or more tables of the debriefing data structure.

14. The method of claim 8, wherein the model type is selected from a group including two or more of a classification type, a regression type, a clustering type, and a time-series type.

15. A non-transitory computer-readable storage medium storing program instructions that when executed cause a processor to perform a method comprising:
receiving training data of a predictive program having a model type from among a plurality of different model types;
identifying values of generic debriefing information from the training data which is generic among the different model types and values of semantic debriefing information from the training data which includes information identifying how to build a debrief report from the values of generic debriefing information;
generating a debriefing data structure that includes the values of the generic debriefing information and a view for the semantic debriefing information;
storing the debriefing data structure; and
querying the debriefing data structure via one or more of structured query language (SQL) and NoSQL queries for the semantic debriefing information and the generic debriefing information, and generating the debrief report based thereon.

16. The non-transitory computer readable medium of claim 15, wherein the generic debriefing information comprises a value for storage type and table data to be processed by the predictive program.

17. The non-transitory computer readable medium of claim 15, wherein the semantic debriefing information further comprises information indicating how to extract data from the generic debriefing information of the predictive program based on a model type of the predictive program.

18. The non-transitory computer readable medium of claim 15, wherein the semantic debriefing information comprises an entity relational representation that identifies relationships between variables of polynomials within the predictive program.

* * * * *